Figure 1:
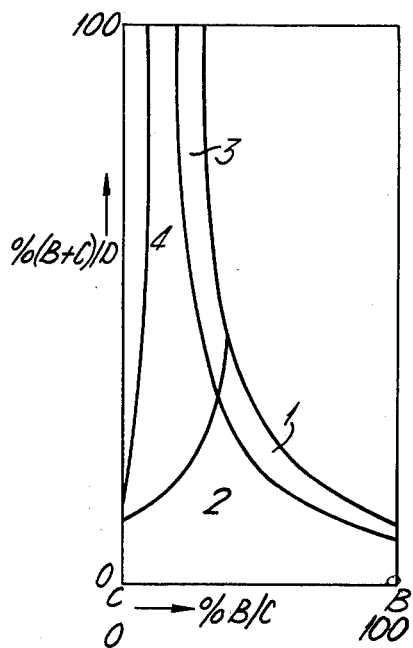

United States Patent [19] [11] 4,283,436
Soeters et al. [45] Aug. 11, 1981

[54] HARD FAT REPLACER AND CHOCOLATE CONTAINING SAME

[75] Inventors: Cornelis J. Soeters, Rotterdam; Cornelis N. Paulussen, Maasland, both of Netherlands; Frederick B. Padley, Welwyn Garden City; David Tresser, London, both of England

[73] Assignee: Lever Brothers Company, New York, N.Y.

[21] Appl. No.: 751,309

[22] Filed: Dec. 16, 1976

Related U.S. Application Data

[63] Continuation of Ser. No. 417,865, Nov. 21, 1973, abandoned, which is a continuation of Ser. No. 240,265, Mar. 31, 1972, abandoned.

[30] Foreign Application Priority Data

Apr. 2, 1977 [GB] United Kingdom ................. 8501/77
Apr. 2, 1977 [GB] United Kingdom ................. 8502/77
Apr. 2, 1977 [GB] United Kingdom ................. 8503/77

[51] Int. Cl.³ .......................... A23D 5/00; A23G 1/00
[52] U.S. Cl. ...................................... 426/607; 426/660
[58] Field of Search ................................ 426/607, 660

[56] References Cited

U.S. PATENT DOCUMENTS

| | | | |
|---|---|---|---|
| 2,975,063 | 3/1961 | Paul et al. | 426/173 |
| 3,431,116 | 3/1969 | Feuge | 426/362 X |
| 3,492,130 | 1/1970 | Harwood | 426/194 |
| 3,541,123 | 11/1970 | Kawada et al. | 260/428.5 |
| 3,686,240 | 8/1972 | Kawada | 426/173 X |

FOREIGN PATENT DOCUMENTS 925805 5/1963 United Kingdom .

*Primary Examiner*—Joseph M. Golian
*Attorney, Agent, or Firm*—James J. Farrell; Melvin H. Kurtz; Irving N. Feit

[57] ABSTRACT

Hard fat replacers, particularly for cocoa-butter, are provided comprising mixtures of mid-fraction from palm oil and at least 85% pure SOS, POS or SOS/POS. SOS is 1,3-distearyl-2-oleyl glycerol and POS is 1-palmityl-2-oleyl-3-stearyl glycerol. Using these hard fat replacers hardened milk chocolate and plain chocolate suitable for tropical use can be prepared as well as excellent normal plain and milk chocolates.

8 Claims, 13 Drawing Figures

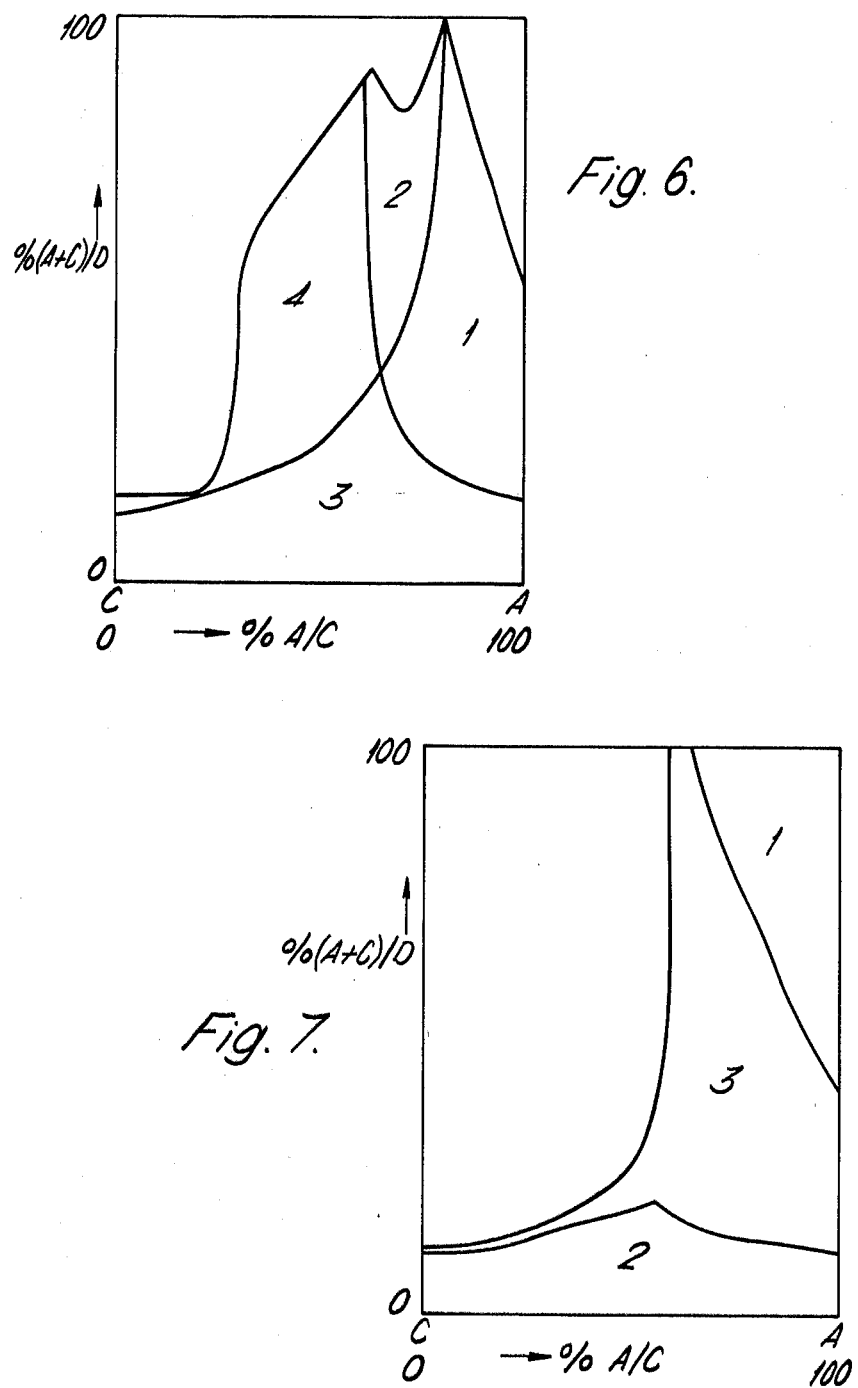

HARD FAT REPLACER AND CHOCOLATE CONTAINING SAME

This is a continuation of application Ser. No. 417,865, filed Nov. 5, 1973, and now abandoned; which is a continuation of Ser. No. 240,265, filed Mar. 31, 1972, now abandoned.

The invention relates to fats, particularly to hard fats, often called hard butters.

Hard fats are specially important in confectionery, bakery and pharmaceutical products. Such fats have the special property that at room temperature they are hard but melt quickly at body temperature in the mouth. The most important example of a hard fat is cocoa-butter. Because of such very special properties, although also because of long association, cocoa-butter can command high prices. There has been a long-standing need for fats to take the place of the generally expensive hard fats. As more fully explained below, fats have been developed that partly meet this need. But all these fats suffer from one or more disadvantages.

A further problem with hard fats is that, although they indeed have special properties particularly fitting them for their use in specialty products such as confectionery, bakery and pharmaceutical products, the theoretical optimum behaviour is far from met by the available fats. For instance there is a need for a fat that would enable chocolate to be prepared that would show less finger-imprinting than chocolate made from cocoa-butter but would still display sharp melting characteristics in the mouth. Further instances are the need for a fat that is more bloom resistant than cocoa-butter and a fat that would enable chocolate to be stored under tropical or semi-tropical conditions; such conditions occur in centrally heated buildings as well as in tropical countries. General needs are for fats that provide more flexibility and for more reliable fats, i.e. fats of more consistent quality, than the hard fats at present available. Such a fat should preferably be compatible with most hard fats, particularly with cocoa-butter.

Many, many prior publications exist that mention fats that can take the place of hard fats such as cocoa-butter. To bring some order into this vast amount of material, these prior publications can be divided into three classes.

A. This is the most numerous and the fats described are those most used in practice. The fats are such that in the preparation of chocolate most of the cocoa-butter must be removed; cocoa-powder containing about 10% cocoa-butter used instead of cocoa-liquor. This is because the fats are not compatible with cocoa-butter. They are nevertheless very useful and are used widely in the preparation of chocolate (note in this specification, as explained later, the term 'chocolate' is given a broad meaning) for example for coating cakes, confectionery bars and ice creams. Examples are fats produced by fractionation and hydrogenation of palm kernel and coconut oils. Examples of publications concerning such fats are U.S. Pat. No. 2,442,536 and GB patent specification Nos. 694,970 and 1,107,206.

B. There are a number of prior proposals for fats that can replace part of the cocoa-butter used, for instance, in chocolate preparation; the fats are, at least to a useful if limited extent, compatible with cocoa-butter. Such fats include illipe butter, also known as Tengkawang fat, as described in Minifie, Chocolate, Cocoa and Confectionery: Science and Technology, J. and A. Churchill, 1970, shea fraction as described in GB patent specification No. 893,337 and U.S. Pat. No. 3,171,748, Mowrah fat as described in U.S. Pat. No. 3,070,445 and Dumari butter, Njave or Baku butter, Phulwara butter and Kepayan oil as described in U.S. Pat. No. 3,084,049. However, the most important examples of such fats are those based on palm mid-fraction as described in GB patent specification Nos. 827,172 and 925,805.

C. There remains a third class of prior publications that describe synthetic mixtures that are reported to be compatible with or to be possible replacers for cocoa-butter. Some of these, such as Chapman et al., J. Chem. Soc., 1957, 1502 and Dutton et al., J. Amer. Oil Chem. Soc., 1961, 38, 96, report mixtures of synthetic fats with cocoa-butter fractions only as part of experiments to try to determine the triglyceride composition of cocoa-butter. Other publications such as U.S. Pat. Nos. 3,012,890, 3,170,799 and 3,410,881 and GB patent specification No. 1,252,224 describe various synthetic triglyceride mixtures as full substitutes or replacers for cocoa-butter. The use of such mixtures with specific fats of classes A and B is not disclosed or suggested. In practice such synthetic mixtures have not been accepted.

It has now been found that the hard fat replacer properties of palm mid-fraction can be surprisingly improved by the incorporation of SOS, 1,3-distearyl-2-oleyl glycerol, or POS, 1-palmityl-2-oleyl-3-stearoyl glycerol, of at least 85% purity.

The invention therefore provides a hard fat replacer comprising a mixture of palm mid-fraction and SOS, POS or SOS/POS of at least 85% purity.

The benefits of the invention are particularly apparent when the hard fat replacer consists principally of palm mid-fraction and SOS, POS or SOS/POS of at least 85% purity; preferably no other fats need be present. Further aspects, inventive in their own right, are described below.

SOS IN PALM MID-FRACTION

It has been found that the incorporation of at least 85% pure SOS in palm mid-fraction gives a fat that is a useful and general partial replacer for cocoa-butter, particularly useful in the preparation of normal plain chocolate. The fat can be used at higher levels in plain and in milk chocolate than can palm mid-fraction. Alternatively, requirements for palm mid-fraction when using such a fat can be less strict than when using palm mid-fraction alone. The incorporation of small amounts of the at least 85% pure SOS has the further advantage that more palm mid-fraction can be incorporated in plain chocolate than when palm mid-fraction alone is used as replacer. A further and very important effect is that the anti-blooming property is even better than that of palm mid-fraction alone. The incorporation of SOS in palm mid-fraction advantageously raises the dilatations and melting point and improves the crystallization and tempering characteristics. The effects are best appreciated when the mixture of the SOS and palm mid-fraction formed by incorporation of the SOS consists of between 5% and 95% of palm mid-fraction and 95% and 5%, particularly between 95% and 20%, of the SOS. 20% is the level above which the anti-bloom properties are particularly significant.

It will be appreciated that one aspect of the invention is fat comprising a mixture of palm mid-fraction and the SOS, particularly in the given proportions. Other aspects are cocoa-butter and chocolate containing such mixtures. By 'the SOS' is meant, of course, the at least 85% pure SOS.

The eating qualities, particularly the cooling effect, are generally better for products containing mixtures made by incorporating at least 85% pure SOS or mixtures of at least 85% pure SOS/POS in palm mid-fraction than for products made by incorporating at least 85% pure SOS or at least 85% pure SOS/POS without palm mid-fraction.

The incorporation of at least 85% pure SOS, optionally in admixture with at least 85% pure POS, in palm mid-fraction is a particularly significant aspect of the invention. It is surprising that the incorporation of the SOS or the SOS/POS mixtures consisting substantially of SOS is so advantageous compared with the incorporation of at least 85% pure POS alone. From the known composition of cocoa-butter, in which POS is the dominant triglyceride, it might have been supposed that the incorporation of the POS would have been especially advantageous.

An at least 85% pure SOS/POS mixture is considered to consist substantially of SOS when at least 60%, preferably at least 80%, of the total SOS and POS, i.e. the specific chemical compounds, is SOS.

The normal level at which Coberine, referred to below, is incorporated in plain chocolate at least in the U.K. is about 18%, based on the total fat content. It has been found that a hard fat replacer consisting of 50 to 80% palm mid-fraction and 50 to 20% at least 85% pure SOS can be incorporated in normal plain chocolate up to at least that level, i.e. even at higher levels. The tempering conditions usually need not be altered. Levels of 40 to 25% at least 85% pure SOS represent an optimum. For instance a fat consisting of 30% palm mid-fraction and 70% of the SOS can be incorporated in cocoa-butter at the 36% level, based on total fat, to give a normal plain chocolate. An indication of the levels at which such hard fat replacers can be used is given in FIGS. 1 and 3.

If the possibility of having to alter tempering conditions is accepted then the following composition is of great interest. It has been found that a hard fat replacer consisting of 70 to 90% palm mid-fraction and 30 to 10% at least 85% pure SOS can be used as a full fat replacer in the preparation of plain chocolate. The replacer preferably consists of 15% at least 85% pure SOS. Preferably the replacer should be used up to the 50% level, based on total fat, particularly preferably at the 30% level. A special advantage is that by use of such replacers at least 40%, for instance 50%, of palm mid-fraction can be incorporated in cocoa-butter.

Further it has been discovered that a fat consisting of a mixture of palm mid-fraction and the SOS and containing up to 42% of palm mid-fraction can be used as a partial replacer for cocoa-butter to give a hardened milk chocolate. A fat consisting of palm mid-fraction and at least 85% pure SOS and containing less than 70% of the SOS, has been found to enable more palm mid-fraction to be incorporated than when palm mid-fraction alone is used as replacer.

It has been found that, when the amount of the at least 85% pure SOS incorporated in the palm mid-fraction is such that the fat obtained consists of 10% to 20% of the SOS and 80% to 90% palm mid-fraction, the fat is an excellent full fat replacer; excellent plain chocolate can be prepared using this fat instead of cocoa-butter. Some adjustment of tempering conditions must be considered. Also, when the fat consists of 20% to 30% of the SOS and 70% to 80% palm mid-fraction, the fat can be used as a full fat replacer to prepare a plain chocolate suitable for tropical use. Some adjustment of tempering conditions must be considered.

SOS, PALM MID-FRACTION AND COCOA-BUTTER

As indicated, an aspect of the invention is the incorporation of at least 85% pure SOS to form ternary mixtures of cocoa-butter, palm mid-fraction and the at least 85% pure SOS. All the fats obtained described above by the incorporation of at least 85% pure SOS with palm mid-fraction can be used to form such ternary mixtures. Preferred levels in which such fats can be incorporated in cocoa-butter are shown in FIG. 1 for plain chocolate and in FIG. 3 for milk chocolate containing 15% milk fat based on total fat.

In all the figures in this specification A represents at least 85% pure POS; B represents at least 85% pure SOS; C represents palm mid-fraction; and D represents cocoa-butter.

In FIG. 1, area 1 represents compositions which give plain chocolate suitable for tropical use; area 2 represents compositions which give normal plain chocolate; area 3 represents compositions which give plain chocolate for tropical use if possible change of tempering conditions is acceptable; and area 4 represents compositions which give normal plain chocolate if possible change of tempering conditions is accepted.

Figure 3:
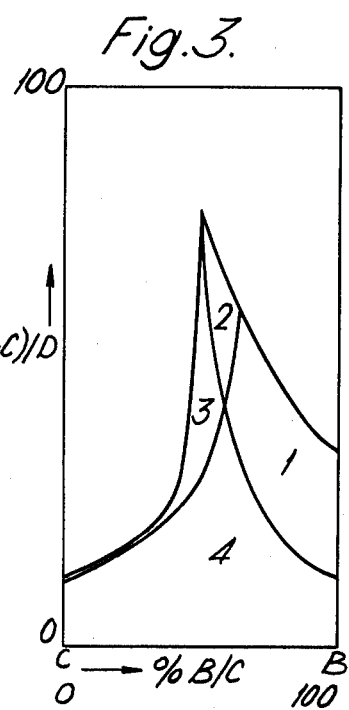

In FIG. 3, area 1 represents compositions which give hardened milk chocolate; area 2 represents compositions which give hardened milk chocolate if possible change of tempering conditions is accepted; area 3 represents compositions which give normal milk chocolate if possible change of tempering conditions is accepted; and area 4 represents compositions which give normal milk chocolate.

It should be noted that the order of mixing does not affect the properties obtained nor does it affect the applicability of the underlying invention, i.e. that the incorporation of at least 85% pure SOS in palm mid-fraction surprisingly improves the hard fat replacer properties of the palm mid-fraction, e.g. the SOS and the palm mid-fraction can be separately mixed into the product. Further ternary mixtures are described as follows.

Figure 2:
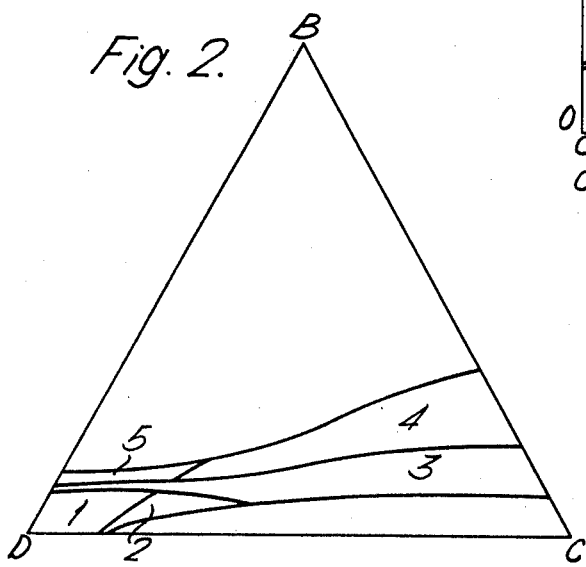

Some preferred compositions can also be represented by the areas 1 and 2 in FIG. 2. A preferred area in which the tempering conditions usually need not be altered is 1.

A fat that consists of a mixture of cocoa-butter, at least 85% pure SOS and palm mid-fraction, and that is represented by area 3 in FIG. 2 has been found to be a full fat replacer in the preparation of adequate plain chocolate.

Fats that have been found to be useful full fat replacers in the preparation of a plain chocolate for tropical purposes are represented by areas 4 and 5 in FIG. 2. Area 5 represents a preferred area in which the tempering conditions usually need not be altered.

Figure 4:
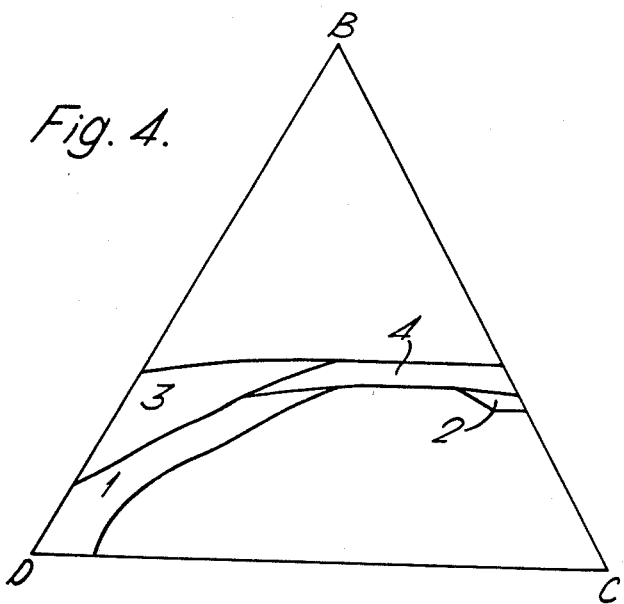

In FIG. 4 are represented preferred ternary mixtures of cocoa-butter, palm mid-fraction and at least 85% pure SOS for the preparation of milk chocolate containing, by weight of total fat, 15% milk fat. Areas 1 and 2 represent compositions that can give normal milk chocolate. Area 3 represents compositions that give adequate milk chocolate. Area 4 represents compositions that can give hardened milk chocolate.

SOS, POS AND PALM MID-FRACTION

As explained above the invention comprises the use of both SOS and POS although the use of SOS, alone or in admixture with POS, is a special feature. Particular advantageous combinations of SOS, POS and palm mid-fraction are described below. It should be noted that the SOS and the POS can be incorporated separately or together. In the first case, each must fulfil the requirement of being at least 85% pure; in the second case, the mixture must fulfil the requirement of being at least 85% pure.

Figure 5:
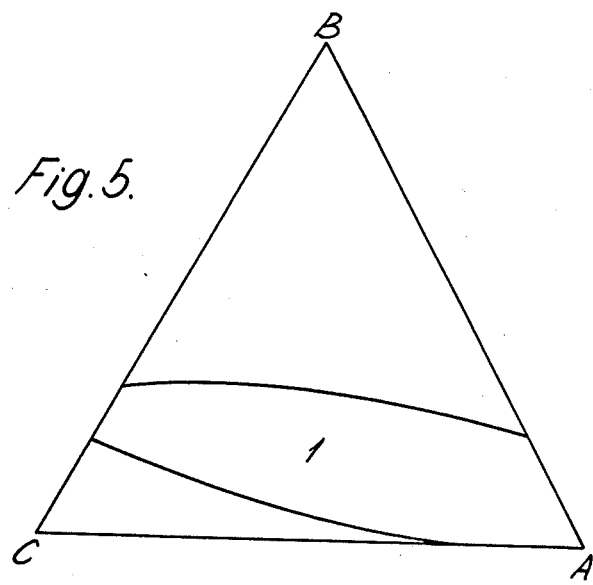

Particularly advantageous hard fat replacers are those that can replace all the added cocoa-butter used in the preparation of chocolate, i.e. that can be used as the additional fat to that present in the cocoa-liquor. The amount of such added fat is usually about 30% of the total fat. It has been found that a hard fat replacer consisting of a mixture of palm mid-fraction, at least 85% pure SOS and at least 85% pure POS and containing less than 30% of the SOS and less than 80% palm mid-fraction can fulfil the advantage. FIG. 5, area 1, represents a preferred range of such replacers which can be used in the preparation of adequate plain chocolate.

It has been discovered that a fat formed by the incorporation of either at least 85% pure SOS or at least 85% pure POS or both and consisting of up to 75% palm mid-fraction, from 0 to 60% of the at least 80% pure POS and any remainder of the at least 85% pure SOS is useful as a partial replacer for cocoa-butter to give a plain chocolate suitable for tropical use. When the percentage of the SOS is greater than 30, there is the additional advantage that the tempering conditions need not usually be altered.

Further such a fat consisting of 3% to 35% of the at least 85% pure SOS, 36 to 54% of the at least 85% pure POS and 15% to 35% palm mid-fraction has been found to be an excellent full fat replacer in the preparation of plain chocolate. Usually the tempering conditions need not be altered.

Also such a fat consisting of 5% to 35% of the at least 85% pure SOS, 30% to 80% of the at least 85% pure POS and 10% to 30% palm mid-fraction has been found to be an excellent full fat replacer in the preparation of a tropical plain chocolate. When the amount of palm mid-fraction is less than 23%, usually the tempering conditions need not be altered.

Also it has been discovered that a fat consisting of a mixture of 27% to 42% of the at least 85% pure SOS, 30% to 50% of the at least 85% pure POS and 17% to 33% palm mid-fraction is a useful full fat replacer in the preparation of milk chocolate. The tempering conditions usually need not be altered.

Also fats having the following compositions, prepared by the incorporation of at least 85% pure SOS and/or POS are useful full fat replacers in the preparation of hardened milk chocolate:

(a) 0% to 30% of the at least 85% pure SOS, at least 70% of the at least 85% pure POS and up to 30% palm mid-fraction;

(b) 15% to 40% of the at least 85% pure SOS, 45% to 70% of the at least 85% pure POS and up to 15% palm mid-fraction, and (c) 40% to 55% of the at least 85% pure SOS, 20% to 55% of the at least 85% pure POS and 5% to 30% palm mid-fraction.

POS IN PALM MID-FRACTION

Such general advantages as more flexibility and consistency of formulation of the incorporation of at least 85% pure POS in palm mid-fraction have been mentioned above. Below are given particularly advantageous levels of incorporation.

It has been found that a fat consisting of a mixture of palm mid-fraction and, based on the fat, at least 40%, preferably at least 60% at least 85% pure POS is a useful hard fat replacer. When it contains between 40% and 60% of the POS it can be used as an adequate replacer for Coberine and can be used at high levels in chocolate. When it contains more than 60% of the POS it can be used at high levels in chocolate to give plain chocolate suitable for tropical use. These replacers are preferably used up to a total of 50%, particularly at 30% of the cocoa-butter normally used.

Coberine is an excellent partial cocoa-butter replacer, as mentioned on page 66 of the book by Minifie referred to above, sold on the U.K. market under this trade name. Such products are described in GB patent specification Nos. 827,172 and 925,805 and contain other fats as well as palm mid-fraction.

It has been discovered that a fat formed by the incorporation of at least 85% pure POS with palm mid-fraction and that consists of palm mid-fraction and up to 80% of the at least 85% pure POS is a useful partial replacer for cocoa-butter. It enables more palm mid-fraction to be incorporated in plain chocolate than when palm mid-fraction alone is used as replacer. Alternatively, requirements for palm mid-fraction can be less strict than when using palm mid-fraction alone.

Also it has been discovered that such a fat consisting of at least 85% pure POS and up to 45% of palm mid-fraction can be used as a partial replacer for cocoa-butter to give a plain chocolate suitable for tropical use.

Also such a fat consisting of 15% to 25% palm mid-fraction and 75% to 85% of the at least 85% pure POS is an excellent full fat replacer; excellent plain chocolate can be prepared using this fat instead of cocoa-butter.

Further such a fat consisting of at least 85% pure POS and up to 50% palm mid-fraction is an excellent full fat replacer for use in the preparation of milk chocolate. When the amount of palm mid-fraction is less than 35%, hardened milk chocolate can be obtained.

POS, PALM MID-FRACTION AND COCOA-BUTTER

As indicated, an aspect of the invention is the incorporation of at least 85% pure POS to form ternary mixtures of cocoa-butter, palm mid-fraction and the at least 85% pure POS. The fats described above obtained by the incorporation of at least 85% pure POS in palm mid-fraction can be used to form such ternary mixtures.

Preferred levels in which such fats can be incorporated in cocoa-butter are shown in FIG. 6 for plain chocolate and in FIG. 7 for milk chocolate.

In FIG. 6, area 1 represents compositions which can give plain chocolate suitable for tropical use; area 2 represents compositions which can give plain chocolate suitable for tropical use if possible change of tempering conditions is accepted; area 3 represents compositions which can give normal plain chocolate; and area 4 represents compositions which can give normal plain chocolate if possible change of tempering conditions is accepted. In FIG. 7, area 1 represents compositions which can give hardened milk chocolate if possible change of tempering conditions is accepted; area 2 represents compositions which can give normal milk chocolate; and area 3 represents compositions which can give normal milk chocolate if possible change in tempering conditions is accepted. As is generally true for products formed by the incorporation of at least 85% pure SOS, POS or SOS/POS the order of mixing does not especially affect the properties obtained. Particular ternary mixtures are as follows.

Figure 8:
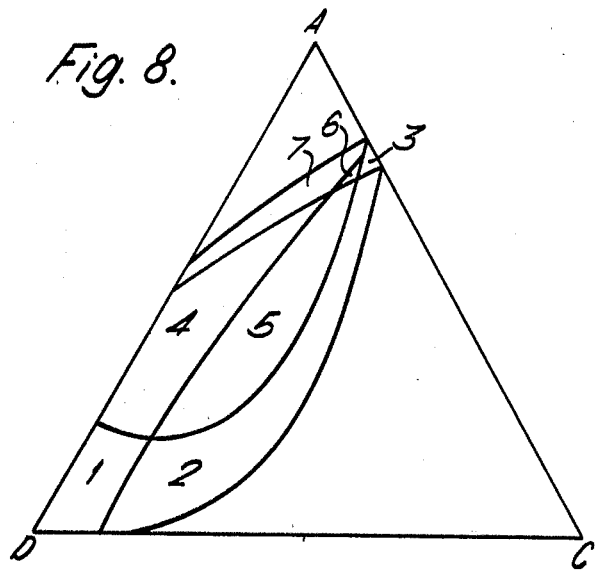

It has been found that the fat compositions shown in FIG. 8 are particularly useful in the preparation of plain chocolate.

The compositions defined by areas 1 and 2 have been found to be useful for preparing normal plain chocolate and those defined by area 3 for preparing adequate plain chocolate. Compositions defined by area 1 are preferred because usually tempering conditions need not be altered.

The compositions defined by areas 4, 5, 6 and 7 have been found to be useful for preparing plain chocolate suitable for tropical use. Compositions defined by areas 4 and 7 are preferred because usually tempering conditions need not be altered. Compositions defined by areas 4 and 5 are preferred because the chocolate prepared has surprisingly sharp melting characteristics in the mouth.

Figure 9:
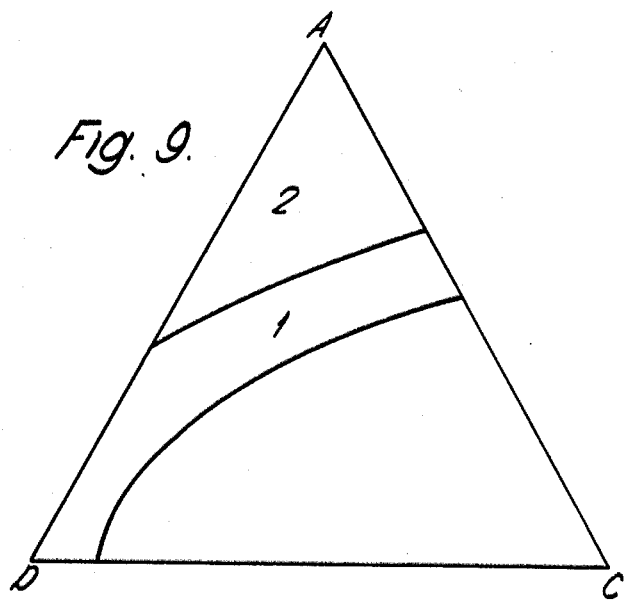

Similarly it has been found that the fat compositions shown in FIG. 9, on the same page as FIG. 4, are particularly useful in the preparation of milk chocolate containing 15% milk fat. Compositions defined by area 1 are particularly useful in the preparation of normal milk chocolate, compositions defined by area 2 in the preparation of hardened milk chocolate.

GENERAL NOTE ON STANDARDS

In this specification reference is constantly made to such terms as 'normal plain chocolate', 'normal milk chocolate', 'plain chocolate suitable for tropical use' and 'hardened milk chocolate'. Such terms are defined below. It must be noted that the percentage limits given in the specification are based on work which, somewhat arbitrarily, assumed that the given standards for such terms had to be met before the hard fat replacer could be stated to be satisfactory for the given purpose. These standards are high and it must be noted that adequate products can, if lower standards were for some reason accepted, be obtained slightly outside the stated limits. It is reasonable to understand 'slightly outside' as covering an extra 5% each way, i.e. for a product containing 10% to 55% for an adequate product the range would be 5% to 60%.

The specification refers to 'cocoa-butter' and 'palm mid-fraction'. These terms too have to be defined, see below. The percentage limits given are based on use of cocoa-butter and palm mid-fraction of defined quality. Use of cocoa-butter or palm mid-fraction of lower or higher quality will affect slightly the relevance of the limits given in the specification: lowering the quality will require the incorporation of more SOS, POS or mixtures of SOS and POS; raising the quality will require the incorporation of less.

The quality of the at least 85% pure SOS, POS or mixture of SOS and POS similarly plays a role. The percentages ranges given in the specification are based on results using material of defined quality, see the section below headed 'Material Used'. Use of SOS, POS. or SOS/POS of lower quality will favour the incorporation of more and the use of SOS, POS or SOS/POS of higher quality will favour the incorporation of less.

The above remarks are meant to indicate that, although the limits are soundly based, they apply primarily to materials as used in the tests; with other materials some latitude for the limits must be accepted.

To avoid overburdening the text will detail the experimental data on which the limits and the figures are based are not given in full. Similarly figures are only given for at least 85% pure SOS, for at least 85% pure POS and for particular mixtures, see FIGS. 10 to 13. It will be appreciated that because the SOS and the POS do not disadvantageously influence each other either alone or in the presence of palm mid-fraction or cocoa-butter, similar figures demonstrating the advantages could be presented for other mixtures.

All the percentages in the specification are by weight.

Of course, the impurities in the at least 85% pure SOS, POS or SOS/POS must be edible, for instance should be mainly other triglycerides.

DEFINITIONS

Palm Mid-Fraction

The palm mid-fractions, and the preferred palm mid-fractions, that can be used in the present invention are those that can be used in the invention described in GB patent specification No. 827,172.

References to oleic acid and its derivatives in the above description are intended to cover all cis-octadecenoic acids, particularly cis-octadec-n-enoic acids where $n$ is 6 to 12, although oleic acid itself is the preferred and most convenient of these acids.

Chocolate

In some countries the term 'chocolate' can only be used for products fulfilling certain requirements. In this specification for simplicity the term 'chocolate' is intended to cover all solid, edible fat products based on cocoa, i.e. cocoa-powder or cocoa-liquor, whether or not the fat is partly cocoa-butter.

Normal Plain Chocolate

In the work on which the preferred limits for the use of at least 85% pure SOS, POS or SOS/POS is based it was taken that a hard fat replacer had to fulfil the following dilatation limits for it to be useful for preparing normal plain chocolates: $D_{20}>1800$, $D_{25}>1700$, $D_{30}$ 1100–1400 and $D_{35}>100$.

Adequate Plain Chocolate

Similarly the dilatation limits for a hard fat replacer according to the invention to be useful in the preparation of adequate plain chocolate were taken to be $D_{20}>1800$, $D_{30}$ 1100–1400 and $D_{35}$ 100–200.

Plain Chocolate suitable for Tropical Use

Similarly the limits were taken to be $D_{20}>1800$, $D_{30}>1400$ and $D_{35}>200$ for a hard fat replacer that could be used to give a plain chocolate suitable for tropical use.

Normal Milk Chocolate

Similarly the dilatation limits for a hard fat replacer for use in preparing a normal milk chocolate containing 15% milk-fat were taken to be $D_{20}>1300$, $D_{30}$ 600–900 and $D_{35}>100$.

Adequate Milk Chocolate

Similarly the limits were taken to be $D_{20} > 1300$, $D_{30}$ 600–900 and $D_{35}$ 100–200 for a hard fat replacer in the preparation of adequate milk chocolate.

Hardened Milk Chocolate

Similarly the limits were taken to be $D_{20} > 1300$, $D_{30} > 900$ and $D_{35} > 200$ for a hard fat replacer in the preparation of a hardened milk chocolate.

It will be noted that all the work on milk chocolate used 15% milk fat, based on total fat. This level is usual but of course other levels can be used without losing the advantages of the invention. In general the more milk-fat is used the more SOS, POS or SOS/POS, particularly SOS or SOS/POS consisting substantially of SOS, should be used.

Replacer

As described, for instance, in Minifie, Chocolate, Cocoa and Confectionery: Science and Technology, J. and A. Churchill, London, 1970, chocolate is normally prepared using either cocoa-powder or cocoa-liquor, which contains more cocoa-butter. In either case cocoa-butter must be added. In this specification the term 'full replacer' is used for a hard fat replacer that can be used successfully with cocoa-powder, which normally contains about 10% of the total fat requirements, in the preparation of chocolate. 'Partial Replacer' means that the hard fat replacer can only replace part of the cocoa-butter required if cocoa-powder is used and 'replacer' means that at least part of the cocoa-butter required can be replaced.

Natural Fats

In the present specification references to such fats, e.g. Shea, Illipé and Phulwara, are to be taken to refer to the fats as described in Hilditch and Williams, The Chemical Constitution of Natural Fats, Chapman and Hall, London, 1964.

MATERIALS USED

Cocoa-Butter

In all the experiments on which the limits are based good quality, pure, pressed cocoa-butter was used. The characteristics are given in the following table.

Palm Mid-Fraction

The product used in the experiments was prepared by acetone fractionation as described in GB patent specification No. 827,172. Its characteristics are given in the following table.

| Component | Palm Mid-Fraction | Cocoa Butter |
|---|---|---|
| Iodine value | 34.4 | 37.6 |
| Melting point (°C.) | 33.4 | 33.5 |
| Refractionation index $N^{65}D$ 1.4 | 468 | 478 |
| f.f.a (%) | 0.1 | 0.57 |
| Mono glycerides (%) | traces | 0.7 |
| Diglycerides (%) | 1.5 | 2.1 |
| Triglycerides* (%) | 98.5 | 96.7 |
| S 3 (% of Triglycerides) | 3.1 | 0.9 |
| S 2 U (% of Triglycerides) | 83.6 | 80.0 |
| S U 2 (% of Triglycerides) | 9.8 | 17.6 |
| U 3 (% of Triglycerides) | 3.5 | 1.5 |
| Asymmetric Triglycerides in S 2 U fraction | 7.1 | |
| in S U 2 fraction | | 8.3 |
| Fatty acid composition** | | |
| C 14: 0 | 0.4 | traces |
| C 16: 0 | 57.1 | 26.4 |
| C 16: 1 | | 0.6 |
| C 17: 0 | | traces |
| C 18: 0 | 7.5 | 34.4 |
| C 18: 1 | 32.0 | 35.8 |
| C 18: 2 | 3.0 | 2.5 |
| C 20: 0 | traces | 0.3 |
| C 20: 1 | | traces |

*S = saturated; U = unsaturated
**e.g. C 18 : 1 = mono unsaturated $C_{18}$ fatty acid.
At least 85% pure SOS and POS.

The analyses of the products used in the experiments on which the limits given in the specification (including the figures) for the use of at least 85% pure SOS, POS and SOS/POS are based are given in the following Table.

TABLE

| | SOS | | | | | |
|---|---|---|---|---|---|---|
| | (1) | | (2) | | (3) | |
| Acid value | 0.6 | | 0.4 | | 0.1 | |
| Saponification value | 190.0 | | 190.0 | | 191.0 | |
| Iodine values | — | | — | | 28.2 | |
| Triglyceride (%) | 99 | | >99 | | | |
| Lipase Analysis | Total | 2-position | Total | 2-position | Total | 2-position |
| C 16: 0 | 1.4 | 0.3 | 2.4 | 0.4 | 1.6 | 0.5 |
| C 17: 0 | 0.6 | — | 0.9 | 0.1 | 0.7 | — |
| C 17: 1 | — | — | 0.1 | 0.1 | — | — |
| C 18: 0 | 63.3 | 3.2 | 63.2 | 2.3 | 65.1 | 3.2 |
| C 18: 1 | 32.1 | 94.0 | 30.0 | 94.6 | 30.7 | 95.2 |
| C 18: 2 | 0.9 | 1.7 | 1.1 | 1.6 | 0.7 | 0.7 |
| C 20: 0 | 1.2 | 0.1 | 1.3 | — | 1.3 | 0.2 |
| C 20: 1 | 0.1 | 0.4 | 0.1 | 0.2 | — | 0.3 |
| C 20: 2 | 0.2 | — | 0.1 | 0.2 | — | — |
| Unsaturated | 33.3 | 96.1 | 31.7 | 97.2 | 31.4 | 96.2 |

| | POS | | | | | |
|---|---|---|---|---|---|---|
| | (1) | | (2) | | (3) | |
| Acid value | 0.1 | | 0.4 | | 0.1 | |
| Saponification value | 196.0 | | 194.8 | | 198.5 | |
| Iodine value | — | | — | | 28.8 | |
| Triglyceride (%) | 99 | | >99 | | | |
| Lipase Analysis | Total | 2-position | Total | 2-position | Total | 2-position |
| C 16 : 0 | 31.2 | 1.0 | 30.5 | 0.8 | 30.4 | 0.9 |
| C 17 : 0 | 0.4 | — | 0.5 | — | 0.4 | — |
| C 17 : 1 | — | — | — | — | — | — |
| C 18 : 0 | 33.4 | 1.0 | 37.6 | 1.1 | 36.0 | 1.7 |
| C 18 : 1 | 33.1 | 96.1 | 29.6 | 95.6 | 32.2 | 96.1 |
| C 18 : 2 | 0.7 | 1.3 | 0.7 | 1.6 | 0.3 | 0.4 |
| C 20 : 0 | 0.6 | 0.1 | 0.6 | — | 0.6 | 0.2 |
| C 20 : 1 | 0.2 | — | — | — | — | 0.3 |
| C 20 : 2 | 0.2 | — | — | — | — | — |
| Unsaturated | 34.2 | 97.8 | 31.1 | 98.1 | 32.5 | 96.8 |

AVAILABILITY OF AT LEAST 85% PURE SOS, POS AND SOS/POS

In principle the at least 85% pure SOS, POS or SOS/POS can be a natural fat, or a fraction of a natural fat. Although fractions of natural fats have been prepared that at least purport to be at least 85% pure SOS, the use and particular advantages of such a fat with palm mid-fraction have never been suggested. Indeed, probably because of other components present, the use of such natural fats is not entirely satisfactory even if cost is ignored. Preferred at least 85% pure SOS, POS or SOS/POS are formed by synthesis based, for acceptability reasons, on natural fats as starting materials. Suitable preparative methods are indicated, for instance, by Malkin and Brown in Prog. Chem. Fats and Lipids, 4, 64 to 67 and Hartman in Chem. Rev., 58, 845 to 867. Particular synthetic routes starting from natural fats are indicated in U.S. Pat. Nos. 3,012,890 and 3,410,881 and in our co-pending UK patent application Nos. 10,869/70 and 54,118/70. It will be appreciated that any impurities present must be acceptable in food products and that such impurities will normally be other triglycerides.

TESTS AND PROCEDURES

1. Determination of Cooling Curves

Cooling curves were determined by methods based on those of Pichard (Compt. Rend. 176, 1224, 1923) and Jensen ("The Chemistry, Flavouring and Manufacture of Chocolate Confectionery and Cocoa", H. R. Jensen, P. Blakistons' Son and Co. Inc., Philadelphia, 1931). The methods differ essentially in that in the former the fat sample is allowed to cool undisturbed, while in the latter method the sample is stirred during crystallization.

1.1 Pichard Test

Preparation of Sample

All traces of crystal nuclei in the sample are eradicated by melting 50 g at 70° C. for 5 minutes.

Stabilisation

The sample is allowed to solidify at 15° C. while stirring. Subsequently the sample is tempered for 1 hr. at 28° C., stirring being continued, and maintained at 40° C. for 2 hrs. It is finally filtered through a Büchner funnel at 40° C.

Procedure

A special vessel with a vacuum jacket for containing the sample (Shukoff Flask—see H. J. Vos. Methods of the IUPAC, Oils and Fats Section, Annexe II₃ (1964) for details) is equilibrated at 40° C. It is then rinsed twice with a small amount of hot liquid sample, and finally filled with 27 g. An iron-constantan thermocouple, with a silver disk welded onto the junction to enable mean sample temperature readings to be measured, is inserted into the Shukoff flask. The flask is then immersed up to the shoulder in a water-bath at 15° C. The cold junction of the thermocouple is maintained at 0° C. throughout the determination while its outputs is displayed directly on a 2 mv chart recorder.

1.2 Jensen Test

Preparation of Sample

A minimum quantity of 80 gm. of sample is heated in a beaker to 70° C. and held for five minutes. 75 g of sample are poured into a glass tube which had previously been warmed to 45°–50° C., and the stopper carrying the thermometer, stirrer, and stirrer bearing (a glass sleeve) inserted.

Stabilisation

The tube with contents is placed in a water bath, and maintained at 55°–60° C. for a minimum of 15 minutes. During this time any persisting crystal nuclei should be destroyed.

Procedure

This should be carried out in a draught-free area with an air temperature of 19°–21° C. A high relative humidity should be avoided. The tube is removed from the stabilising bath and the stirrer bearing is "wetted" with fat by raising the stirrer arm.

The sample is cooled in air by gentle continuous stirring, just breaking the surface of the fat until the temperature falls to 40° C. At this point the tube is secured in a large glass jar which serves as an air jacket, using a suitably bored and recessed cork which fits over the neck of the tube (see e.g. diagram in B.P. No. 827,172). The air jacket stands in a water bath which is maintained at 16.5°–17.0° C. throughout the determination, and these conditions are established at least 30 minutes prior to use.

The sample is allowed to cool without stirring to 35° C. when stirring is recommenced in the following manner:

At each 5, 20, 35 and 50 seconds past the minute, as indicated by a stop watch which is started at 35° C., one stirrer stroke (up and down) is made. This should be firm in action with the stirrer ring being raised 25 mm–40 mm above the surface of the fat with each stroke. (This ensures that crystals formed in the bearing are carried down to the bulk of the sample to achieve positive "seeding").

At 32° C., or immediately above or below, temperature readings are recorded at the start of each minute and continued every minute until the end of the test. The temperature at which fat crystals first appear in the main bulk of the sample is recorded as the "point of first crystals" (Jensen-Supercooling Limit). The temperature will continue to fall until the "Minimum" point is reached (T min) after which it will commence to rise. From this point it is essential that the stirring stroke is sufficiently firm to ensure mixing of the sample. At the point where the temperature rise becomes less than 0.1° C./minute, or when the solidifying fat becomes so stiff that a risk of breakage is incurred, the stirring is discontinued, when a further small rise in temperature will occur. Recording is continued until the temperature begins to fall or five consecutive readings do not alter. The highest temperature obtained is recorded as the "Maximum" (T max). From this information the temperature rise (T max−T min=T) is determined. The "Total Time" (t) is the number of minutes taken to reach the Maximum after commencing to take temperature readings at 32° C.

The recorded temperatures are plotted against time on 0.1" graph paper as follows:

0.1"=0.2° C./0.1"=2 minutes.

2. Determination of Stabilised Dilatation

The fat sample is melted and filtered. It is then poured into a 100 ml round-bottomed flask, a few pieces of porous pot added, and heated to 80°–100° C. The sample is then evacuated in a sufficient vacuum for at least 10 minutes, shaking vigorously at intervals, until air bubbles no longer escape. The melted fat is kept under vacuum until it has been put into the dilatometer. By means of a burette, exactly 1.5 ml distilled water boiled out under vacuum, and colored with dye (1% potassium chromate) are placed in a standard dilatometer (see B.p. No. 925,805). The dilatometer and stopper are weighed with an accuracy of 10 mg.

The dilatometer is warmed to prevent crystallisation of the fat and filled to halfway up the neck with the prepared liquid fat (ca. 69). The stopper is firmly inserted thereby causing the water to rise in the capillary. It should be ensured that no air remains under the stopper. After cleaning and drying, the dilatometer is weighed again to determine the weight of the fat. The dilatometer is immersed up to the zero mark in a water-bath at a temperature of 60° C. (±0.1° C.). The height of the water in the capillary is determined after 30 minutes equilibration ("base-reading").

The filled dilatometer is chilled in an ice/water bath for 1½ hrs. The fat sample is then stabilised by placing in a water-bath at 26° C. for 40 hrs. It is finally chilled again in an ice/water bath for 1½ hours, and placed in a water-bath at 20° C. (±0.1° C.). The position of the water meniscus is read off the capillary and the temperature increased in steps of 5° C. each half-hour up to 40° C., taking readings of the meniscus level at each temperature. Finally the dilatometer is heated again to 60° C. and the "base reading" is redetermined. If the initial and final "base-readings" differ by more than 2 mm³ the whole operation is repeated.

The dilatation is given by the formula $$D_t = (25/z)(A_{60} - A_t - W_t) - V_t$$

where
$D_t$ = dilatation of fat at t° C.
$z$ = weight of fat in dilatometer
$A_{60}$ = reading at 60° C.
$W_t$ = water correction; correction for the expansion of water and glass between 60° C. and t° C.
$V_t$ = oil correction; difference in volume of 25 g fat at 60° C. and t° C.

3. Preparation of chocolate

3.1 Chocolate Composition

The starting materials consist of a pre-conched masses of the following compositions, refined to a particle size of 15 microns:

For plain chocolate containing 30% or less, based on total fat, non-cocoa-butter fat 44% cocoa liquor (contains 70% of the total fat as cocoa-butter)
44% sugar
12% fat including, when less than 30% of non-cocoa-butter fat, cocoa-butter For plain chocolate containing more than 30%, based on total fat, non-cocoa-butter fat 22% cocoa-powder (contains 10%, based on cocoa-powder, cocoa-butter)
44% sugar
34% fat including, when appropriate, cocoa-butter For milk chocolate using cocoa-liquor 10% cocoa liquor
22% full cream milk powder (contains 24% milk fat)
43% sugar
25% fat including, when appropriate, cocoa-butter For milk chocolate using cocoa-powder 5% cocoa-powder (contains 10% cocoa-butter)
22% full cream milk powder (contains 24% milk fat)
43% sugar
30% fat including, when appropriate, cocoa-butter These were the standard compositions used in this work. The masses are blended in a Hobart mixer until homogeneous, and conched prior to tempering. 0.4% lecithin is used.

3.2 Chocolate-Making

Procedure 800 g of the mass to be tempered is placed in a tempering vessel and stirred for approximately one hour at 60° C. Stirring is continued until the end of the process. Tempering is carried out by lowering the temperature to 30° C. When the whole mass has reached 30° C., which takes 30–35 minutes, it is seeded with 0.1% of stabilised crystals from the original pre-conched mass. After 20 minutes samples are taken at five minute intervals, and the cooling curves determined by tempermeter. The time taken at 30° C. to achieve the correct degree of temper is carefully recorded. The fully tempered chocolate is moulded in bars and cooled in a cabinet at 7° C., after demoulding the samples are stored at 20° C. for two days to allow stabilisation. At the end of this period part of the chocolate is assessed at 20° C. for hardness, snap, fracture, and finger marking. The remainder of the chocolate is placed in a temperature-controlled cabinet at 25° C. ±0.5° C. for bloom evaluation (the relative humidity is kept below 60%, and there is provision for air circulation through the cabinet).

3.3 Chocolate Evaluation

Tempering

A tempering time at 30° C. of between 30 and 60 mins according to our standard procedure outlined above indicates that the chocolate usually can be tempered using normal factory equipment without the necessity for changing normal operating conditions. A good correlation was obtained between tempering time and cooling curve characteristics at least for plain chocolate, and the latter were often used to predict the former.

Demoulding

If a cooling time of 20–25 mins. in the 7° C. cabinet is required in order to obtain enough shrinkage for demoulding, no problems are to be expected as far as contraction is concerned. All samples were found to be satisfactory in this respect.

Snap/Hardness

Hardness was determined by adaptation of the Brinell Test as described by C. J. Soeters in "Fette, Seifen, Anstrichmittel", No. 8, 711 (1970). Chocolate with a good snap should preferably have a hardness of at least 40 kg/cm² after storage at 20° C. As hardness tends to increase during storage it was measured again after a period of four weeks.

Fingermarking

This was measured by the method given by C. J. Soeters, in "Fette, Siefen, Anstrichmittel", No. 8, 711 (1970). Chocolate which will not foul the fingers should preferably have a fingermarking value of below 2.0 mm according to this test.

BLOOM RESISTANCE

The rate of fat bloom formation was measured at 25° C. by a method based on that of Hettich (Gordian 65, 3 (1965); Fette, Seifen, Anstrichmittel 66, 1025 (1964), utilising the "velvet effect". This is the name given to the phenomenon due to light scattering observed when the surface of a partially bloomed chocolate bar is viewed at different angles, by analogy with the light reflecting properties of the fabric with the same name. The surface appears to change quite suddenly from a glossy appearance to a greyish hue. In the test the angle at which this transition occurs is determined by means of a goniometer by rotating a platform supporting the chocolate bar against a source of indirect light. Measurements are continued until the angle at which the velvet effect is exhibited has reached 80°. Examination of the surface of bloom bars by microscopy has indicated a correlation between the time taken to reach this angle and the length and number of crystals per unit area. Thus by relating the time taken (in weeks) to reach a defined degree of fat bloom formation on any sample to standard cocoa butter chocolate, one can obtain a measure of the rate of fat bloom formation in a relatively short time.

Figures

The figures are based on many hundreds of investigations and make apparent many advantageous aspects of the invention. Explanations for the codes used have been given in the text.

Figure 10:
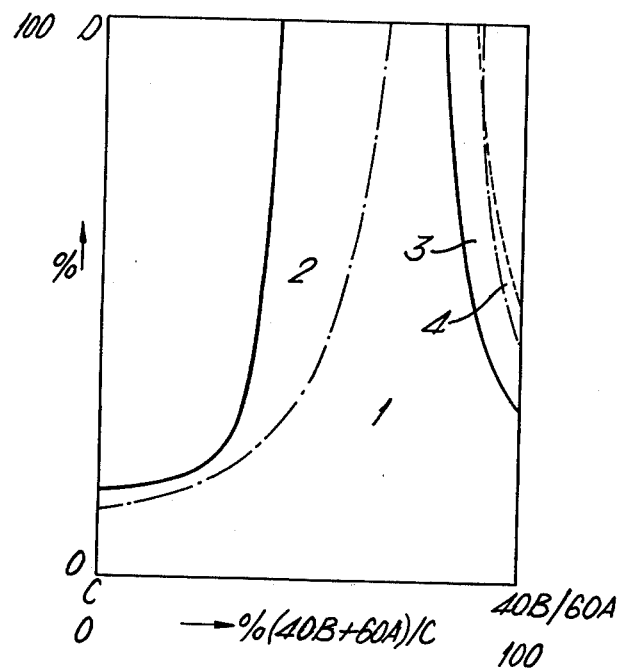
Figure 12:
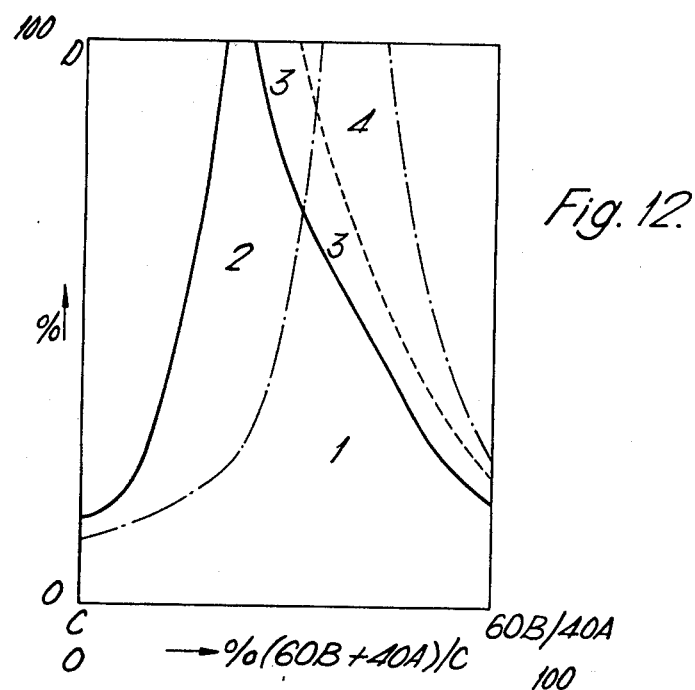

In FIGS. 10 and 12 areas 1 represent compositions that can give normal plain chocolate, areas 2 represent compositions that can give normal plain chocolate if possible change in tempering conditions is accepted, areas 3 represent compositions that can give plain chocolate suitable for tropical use and areas 4 represent compositions that can give plain chocolate suitable for tropical use if possible change in tempering conditions is accepted.

Figure 11:
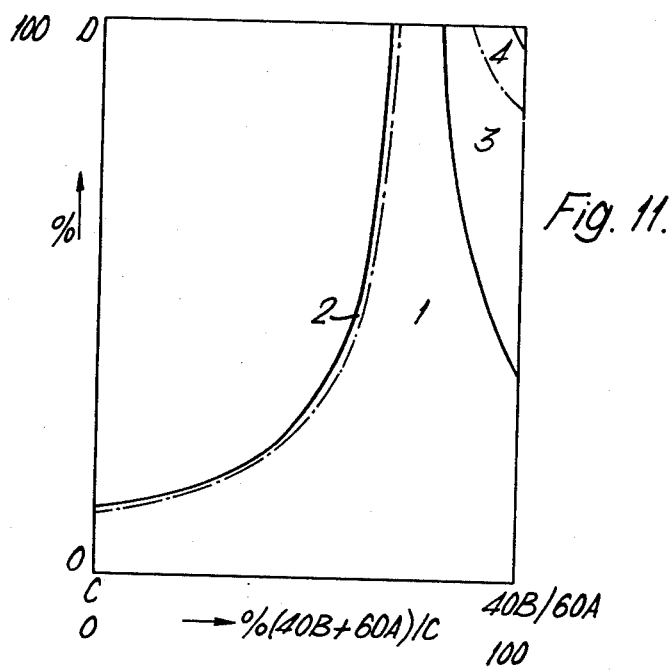
Figure 13:
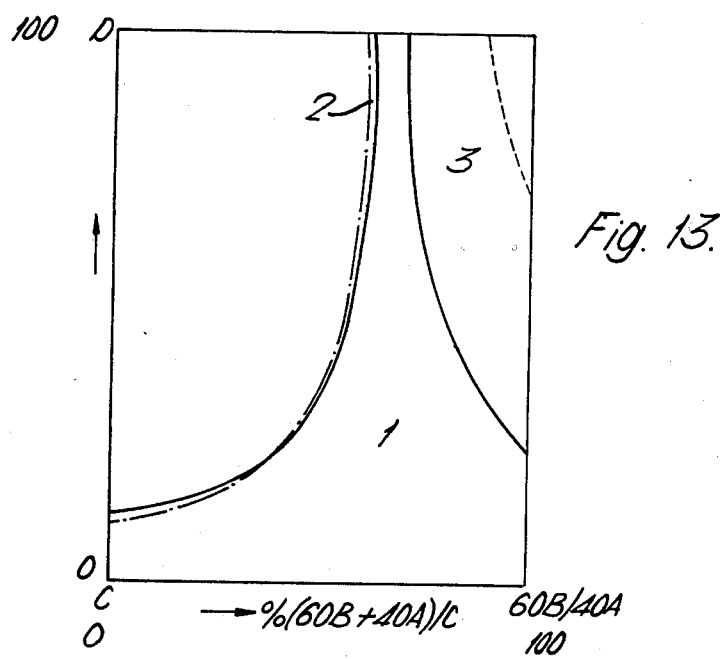

In FIGS. 11 and 13 areas 1 represent compositions that can give normal milk chocolate, areas 2 represent compositions that can give normal milk chocolate if possible change in tempering conditions is accepted, areas 3 represent conditions that can give hardened milk chocolate and areas 4 represent compositions that can give standard milk chocolate if possible change in tempering conditions is accepted.

What is claimed is:

1. A hard-fat replacer consisting essentially of palm mid-fraction and an amount of
   (a) at least 85% pure 1,3-distearyl-2-oleyl glycerol,
   (b) at least 85% pure 1-palmityl-2-oleyl-3-stearyl glycerol, or
   (c) mixtures of said at least 85% pure 1,3-distearyl-2-oleyl glycerol and said at least 85% pure 1-palmityl-2-oleyl-3-stearyl glycerol,
effective to increase the flexibility of palm mid-fraction as a hard-fat replacer.

2. A hard-fat replacer as claimed in claim 1 consisting of, by weight, about 60% to about 75% of said palm mid-fraction and about 40% to about 25% of said at least 85% pure 1,3-distearyl-2-oleyl glycerol.

3. A hard-fat replacer as claimed in claim 1 consisting of, by weight, about 80% to about 90% of said palm mid-fraction and about 10% to about 20% of said at least 85% pure 1,3-distearyl-2-oleyl glycerol.

4. A hard-fat replacer as claimed in claim 1 consisting of, by weight, said at least 85% pure 1,3-distearyl-2-oleyl glycerol, up to about 60% of said at least 85% pure 1-palmityl-2-oleyl-3-stearyl glycerol and up to about 75% of said palm mid-fraction.

5. A hard-fat replacer as claimed in claim 2 consisting of, by weight, said palm mid-fraction and up to about 80% of said at least 85% pure 1-palmityl-2-oleyl-3-stearyl glycerol.

6. Plain chocolate in which the hard-fat consists essentially of a hard-fat replacer as claimed in claim 1 in an amount effective to improve the melting characteristics of the chocolate, in admixture with cocoa-butter as represented in area 1, 2, 3 or 4 of FIG. 1; area 1, 2, 3, 4 or 5 of FIG. 2; area 1, 2, 3 or 4 of FIG. 10; or area 1, 2, 3 or 4 of FIG. 12.

7. Milk chocolate in which the hard-fat consists essentially of a hard-fat replacer as claimed in claim 1 in an amount effective to improve the melting characteristics of the chocolate, in admixture with cocoa-butter as represented in area 1, 2, 3 or 4 of FIG. 3; area 1, 2, 3 or 5 of FIG. 4; area 1, 2 or 3 of FIG. 7; area 1 or 2 of FIG. 9; area 1, 2, 3 or 4 of FIG. 11; or area 1, 2, 3 or 4 of FIG. 13.

8. A method for producing a plain chocolate comprising adding a sufficient amount of the hard-fat replacer of claim 1 in admixture with cocoa-butter to improve the melting characteristics of said chocolate.

* * * * *